(12) United States Patent
Hur et al.

(10) Patent No.: US 12,530,870 B2
(45) Date of Patent: Jan. 20, 2026

(54) METHOD OF ESTIMATING RELATIONSHIP BETWEEN OBJECTS AND ELECTRONIC DEVICE FOR THE SAME

(71) Applicants: Hyundai Motor Company, Seoul (KR); Kia Corporation, Seoul (KR)

(72) Inventors: Minhoe Hur, Seoul (KR); Hyungseok Lee, Seoul (KR); Jaesik Min, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 553 days.

(21) Appl. No.: 17/940,206

(22) Filed: Sep. 8, 2022

(65) Prior Publication Data
US 2023/0162478 A1    May 25, 2023

(30) Foreign Application Priority Data
Nov. 19, 2021  (KR) .................. 10-2021-0160778

(51) Int. Cl.
*G06V 10/764* (2022.01)
*G06F 18/21* (2023.01)
*G06V 10/82* (2022.01)

(52) U.S. Cl.
CPC ............ *G06V 10/765* (2022.01); *G06V 10/82* (2022.01)

(58) Field of Classification Search
CPC .... G06V 10/765; G06V 10/82; G06V 30/413; G06V 30/422; G06F 18/21; G06T 5/20; G06T 7/0004; G06T 7/11; G06T 7/136
See application file for complete search history.

(56) References Cited

U.S. PATENT DOCUMENTS

| 7,082,219 B2 | 7/2006 | Bourbakis et al. |
| 9,712,698 B1* | 7/2017 | Gopalakrishnan .......... G06K 15/1801 |
| 10,373,022 B1* | 8/2019 | Zhang .............. G06V 30/19173 |
| 2018/0173688 A1* | 6/2018 | Melinand ............ G06F 3/04883 |
| 2022/0292665 A1* | 9/2022 | Ueki ...................... G06T 3/4038 |
| 2022/0319219 A1* | 10/2022 | Tsibulevskiy ........... G06F 18/40 |

FOREIGN PATENT DOCUMENTS

| JP | 2007-172475 A | 7/2007 |
| JP | 2014-092817 A | 5/2014 |
| JP | 2019-204417 A | 11/2019 |
| KR | 2012-0011010 A | 2/2012 |
| KR | 2018-0099418 A | 9/2018 |

* cited by examiner

*Primary Examiner* — Jennifer Mehmood
*Assistant Examiner* — Dustin Bilodeau
(74) *Attorney, Agent, or Firm* — Fox Rothschild LLP

(57) ABSTRACT

Provided is a method of estimating a relationship between objects through machine learning, the method comprising receiving a scan image, recognizing a starting point of a relationship line and an object code in the scan image, determining whether a relationship line is present between the recognized starting point and the recognized object code, and, based on determining that the relationship line is present, transmitting a combination of the starting point and the object code connected with the relationship line to a database.

14 Claims, 11 Drawing Sheets

FIG. 3

| VEHICLE TYPE | BODY NO | DEFECT CONTENT | DEFECT POSITION | CORRECTION |
|---|---|---|---|---|
| H2 | D2 071 | DUST | HOOD | O |
| H2 | D2 071 | CONCAVE-CONVEX | FENDER (RR) | X |
| H2 | D2 071 | MARK | DOOR (FR) | O |
| D2 | HW 034 | DUST | FENDER (FL) | O |
| D2 | HW 034 | PAINT RUNNING | C PIL(L) | O |

FIG. 4

| DEFECT CONTENT | MARK | DEFECT CONTENT | MARK | DEFECT CONTENT | MARK |
|---|---|---|---|---|---|
| GRINDER MARK | G/R | BASE RUNNING | BR | OIL | O |
| METAL FINISH | M/F | PEELING | P | PIT | PP |
| PRESS MARK | P/R | SCRATCH | SC | ORANGE PEEL | OP |
| WELDING CHIP | CP | PAINT DIRT | PD | RIPPLE | LF |
| CRAC | CK | PAINT SCATTERING | PW | SEALER DIRT | SF |
| NECK | NK | PAINT DROPLET | DP | SEALER POOR | SR |
| NICK | PG | DUST | D | SEEDING | SD |
| COCAVE-CONVEX | CV | SANDING MARK | S/D | BLUSHING | BS |
| BENDING | DJ | POOR WIPING | WP | CONTAMINATION | OF |
| PAINT NOT ENOUGH | N | PIN HOLE | PH | WATER MARK | B |
| CLEAR NOT ENOUGH | CN | POOR HIDING | CO | BLISTER | B/R |
| BASE NOT ENOUGH | BN | COLOR TRANSFER | TC | POLISHING | POL |
| RUNNING | R | SPOT | VC | TOUCH MARK | T/H |
| CLEAR RUNNING | CR | BUBBLE | BU | DARK PATCH/LIGHT PATCH | A |

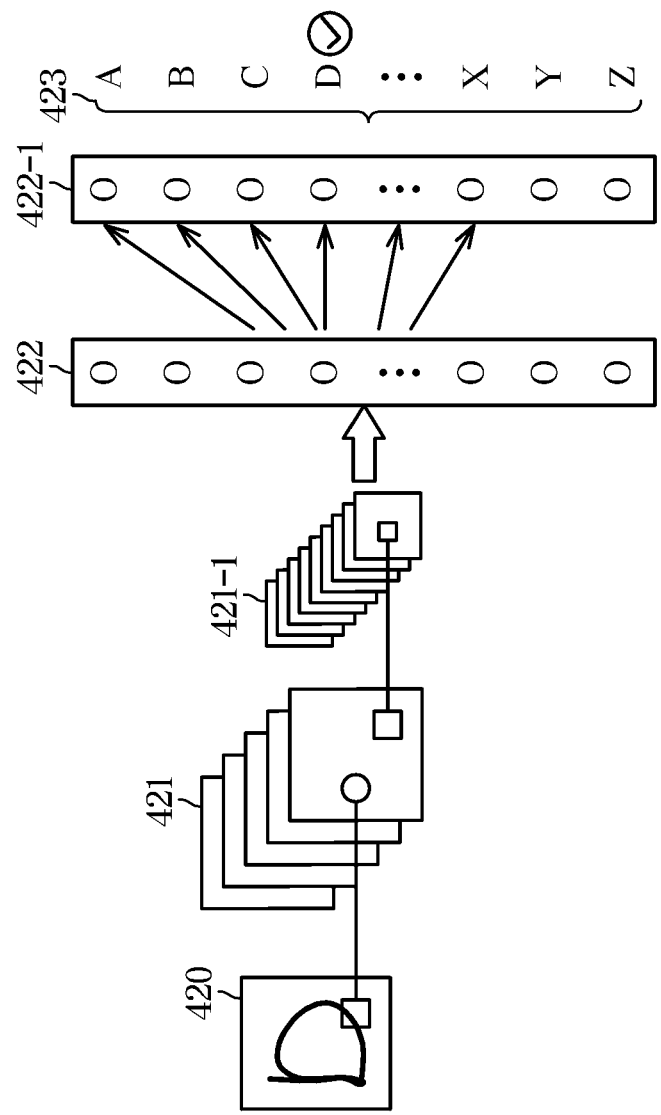

METHOD OF ESTIMATING RELATIONSHIP BETWEEN OBJECTS AND ELECTRONIC DEVICE FOR THE SAME

CROSS-REFERENCE TO RELATED APPLICATION(S)

This application claims, under 35 U.S.C. § 119(a), the benefit of Korean Patent Application No. 10-2021-0160778, filed on Nov. 19, 2021 in the Korean Intellectual Property Office, the disclosure of which is incorporated herein by reference in its entirety.

BACKGROUND

Technical Field

Embodiments of the present disclosure relate to a method of automatically estimating a result of a paint test sheet and an electronic device for the same.

Description of the Related Art

A paintwork of a vehicle frame may have various defects, such as scratches and foreign substances, and the defects may damage the value or appearance of the product, so it is important to identify and remove the defects in the manufacturing process.

To this end, an inspector manually writes a defect code on a paint test sheet, connects the defect code to a defect site with a relationship line, and then scans the paint test sheet to inspect the paintwork of the vehicle frame one by one, but such a manual inspection takes a great amount of manpower and time.

SUMMARY

Therefore, it is an object of the present disclosure to provide a method of estimating a relationship between objects capable of estimating a relationship between objects by detecting a handwritten relationship line between a defect site and a defect code in a paint test sheet through machine learning, and an electronic device for the same.

The technical objectives of the present disclosure are not limited to the above, and other objectives may become apparent to those of ordinary skill in the art based on the following descriptions.

According to an aspect of the present disclosure, there is provided a method of estimating a relationship between objects through machine learning, the method comprising: receiving a scan image; recognizing a plurality of starting points and a plurality of object codes in the scan image; determining whether a relationship line is present between the recognized plurality of starting points and the recognized plurality of object codes; and based on determining that the relationship line is present, transmitting a combination of the starting point and the object code connected with the relationship line to a database.

The determining whether a relationship line is present between the recognized plurality of starting points and the recognized plurality of object codes may comprise cropping an area comprising a plurality of combinations between the plurality of starting points and the plurality of object codes in the scan image, and wherein each of the plurality of combinations may comprise one of the plurality of starting points and at least one of the plurality of object codes, or at least one of the plurality of starting points and one of the plurality of object codes.

The determining whether a relationship line is present between the recognized plurality of starting points and the recognized plurality of object codes may comprise converting the image such that the starting point is positioned in a predetermined direction in the cropped image.

The recognizing of the object code in the scan image may comprise representing a degree of similarity between a recognized text and an object code as a probability, and based on the degree of similarity being greater than or equal to a preset probability, determining the recognized text as the object code.

The method may further comprise: setting defect sites based on an area boundary line of a development view of a vehicle; and determining a position of the starting point as a defect site and transmitting the defect site to the database.

The method may further comprise obtaining a machine learning model for determining whether the relationship line between the starting point and the object code is present by learning a relationship between a plurality of existing starting points and a plurality of existing object codes using a Convolution Neural Network (CNN), wherein the machine learning model employs a detection algorithm to recognize the starting point and the object code, and employs a classification algorithm to determine whether the relationship line is present.

The obtaining of the machine learning model may comprise: labeling presence or absence of the relationship; cropping an image of a part that in which the starting point is related to the object code and an image of a part in which the starting point is unrelated to the object code, and storing the cropped image(s) in a memory; and converting the cropped image(s) such that the starting point is positioned toward in a upper right direction; and masking a part other than the starting point and the object code in the cropped image.

The determining whether a relationship line is present between the starting point and the recognized object code may comprise recognizing a thickness of the relationship line, and determining a higher importance of the relationship between the objects as the thickness of the relationship line is larger.

The determining whether a relationship line is present between the starting point and the recognized object code may comprise recognizing a shape of the relationship line, and classifying an attribute of the relationship between the objects according to the shape of the relationship line.

There is provided an electronic device for estimating a relationship between objects through machine learning, the electronic device comprising: a communicator configured to receive a scan image; a memory in which the scan image received by the communicator is stored; a processor configured to recognize a plurality of starting points and a plurality of object codes in the scan image, determine whether a relationship line is present between the recognized plurality of starting points and the recognized plurality of object codes to estimate a presence or absence of a relationship, and based on determining that the relationship line is present, transmit a combination of the starting point and the object code connected with the relationship line to a database.

The processor may be configured to: crop an area comprising a plurality of combinations between the plurality of starting points and the plurality of object codes in the scan image, and wherein each of the plurality of combinations comprises one of the plurality of starting points and at least one of the plurality of object codes, or at least one of the plurality of starting points and one of the plurality of object codes.

The processor may be configured to convert the image such that the starting point is positioned in a certain direction in the cropped image.

The processor may be configured to mask a part other than the starting point and the object code in the converted image.

The processor may be configured to represent a degree of similarity between a recognized text and an object code as a probability, and based on the degree of similarity being greater than or equal to a preset probability, determine the recognized text as the object code.

The processor may be configured to set defect sites based on an area boundary line of a development view of a vehicle, and determine a position of the starting point as a defect site and transmit the defect site to the database.

The processor may be configured to: obtain a machine learning model for determining whether the relationship line between the starting point and the object code is present by learning a relationship between a plurality of existing starting points and a plurality of existing object codes using a Convolution Neural Network (CNN), wherein the machine learning model may employ a detection algorithm to recognize the starting point and the object code, and employ a classification algorithm to determine whether the relationship line is present.

The processor may be configured to label presence or absence of the relationship; crop an image of a part that in which the starting point is related to the object code and an image of a part in which the starting point is unrelated to the object code, and store the cropped image(s) in the memory; convert the cropped image(s) such that the starting point is positioned in a certain direction; and mask a part other than the starting point and the object code in the cropped image.

The processor may be configured to recognize a thickness of the relationship line, and determine a higher importance of the relationship between the objects as the thickness of the relationship line is larger.

The processor may be configured to recognize a shape of the relationship line, and classify an attribute of the relationship between the objects according to the shape of the relationship line.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 3 is a diagram illustrating a form of a paint test sheet result being stored in a database in the method of estimating a relationship between objects according to the embodiment;

FIG. 4 is a diagram illustrating an example of defect codes of the method of estimating a relationship between objects according to the embodiment;

FIG. 5 is a diagram illustrating a convolution neural network (CNN), which is a machine learning network applied to the method of estimating a relationship between objects according to the embodiment;

DETAILED DESCRIPTION

Figure 1:
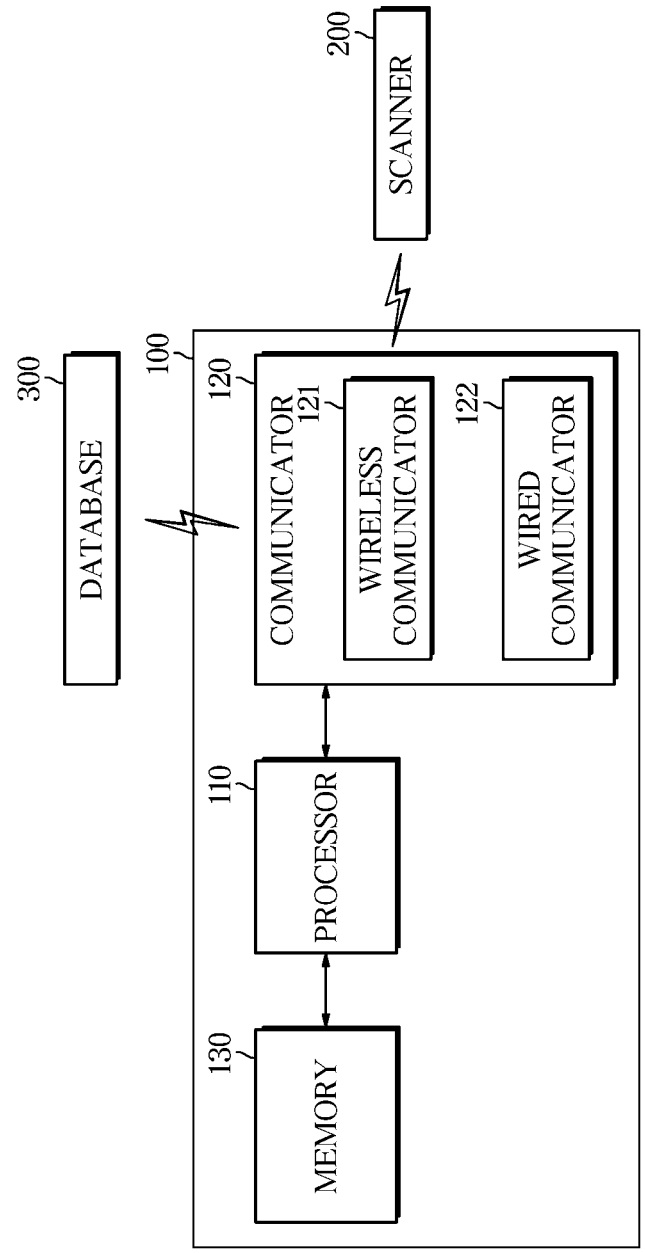
FIG. 1 is a diagram illustrating a control block diagram illustrating a method of estimating a relationship between objects according to an exemplary embodiment.

The embodiments described in the present specification and the configurations shown in the drawings are only examples of preferred embodiments of the present disclosure, and various modifications may be made at the time of filing of the present disclosure to replace the embodiments and drawings of the present specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Identical symbols or numbers in the drawings of the present disclosure denote components or elements configured to perform substantially identical functions.

The terms used herein are for the purpose of describing the embodiments and are not intended to restrict and/or to limit the present disclosure. For example, the singular expressions herein may comprise plural expressions, unless the context clearly dictates otherwise. In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may in addition be referred to as a first component.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an exemplary embodiment of a method of estimating a relationship between objects and an electronic device 100 for the same according to an aspect will be described in detail with reference to the accompanying drawings.

FIG. 1 is a diagram illustrating a control block diagram illustrating a method of estimating a relationship between objects according to an exemplary embodiment.

Referring to FIG. 1, an electronic device 100 for estimating a relationship between objects comprises a processor 110, a communicator 120, and a memory 130.

The processor 110 may be configured to control the communicator 120 to receive a scan image of a handwritten test sheet from a scanner 200. In addition, the processor 110 may be configured to store the received scan image in the memory 130 configured to store image files.

The processor 110 may be configured to use machine learning by a method, which will be described below, to recognize an object that is to be detected, and when a relationship line exists between the objects, recognize the relationship line and estimate a result of a paint test sheet.

The processor 110 may be configured to control the communicator 120 to transmit the result of the paint test sheet estimated above to a database 300. Since the database 300 may be configured to store the results of the paint test sheet and may be configured to view or sort the results by index, the results of the paint test sheet may be configured to be efficiently managed by a paintwork inspector, and may be configured to be used as data to improve the quality of a paintwork.

The processor 110 may be configured to recognize a starting point of a relationship line and an object code in the scan image by deep learning. Here, the object code may be a defect code, and the object code is not limited to the defect code and may comprise all types of information about an object that may be manually recorded by an operator.

A method of recognizing the starting point of the relationship line and the object code by the processor 110 may be configured to employ a detection algorithm of machine learning, and there is no limitation on the algorithm as long as it can detect a feature point in an image.

The processor 110 may be configured to recognize a starting point of a relationship line and an object code first, and then check whether a relationship line is present between the recognized starting point and the recognized object code.

In the related art, a relationship line is recognized first and then information about both ends of the relationship line is recognized to check whether a relation between the objects is present, for which there is a difficulty in recognizing a handwritten relationship line.

For example, when the processor 110 recognizes a handwritten relationship line first, there is a possibility of unclear marks between objects. That is, since the relationship line is manually written by an operator, the end of the relationship line may not be connected to the object code or the relationship line may be broken, so that the object code at the end of the relationship line may not be recognized even when the relationship line is recognized.

In addition, when the processor 110 recognizes the handwritten relationship line first, there is a possibility that the handwritten relationship is mixed with surrounding contaminations or other marks.

Figure 2:
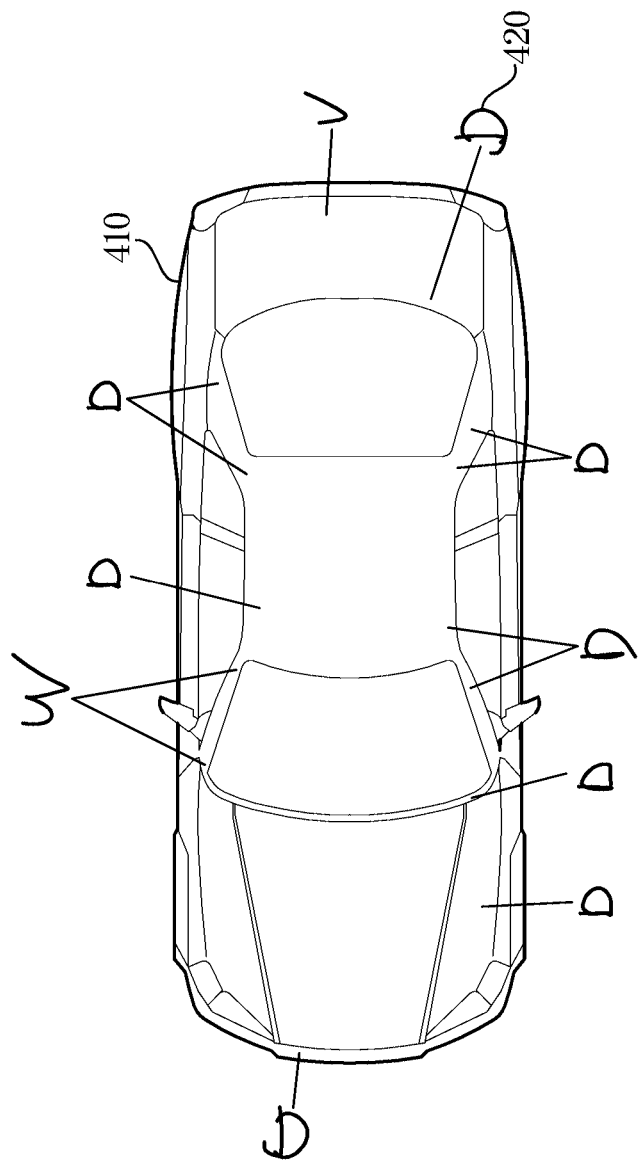
FIG. 2 is a diagram illustrating a vehicle development view and defect codes in the method of estimating a relationship between objects according to the embodiment.

For example, a test sheet for testing a paint work of a vehicle 410 is composed of a development view of the vehicle 410 printed with various types of straight lines and curved lines which may be misrecognized as a relationship line, as shown in FIG. 2.

The method of estimating a relationship between objects according to the embodiment described below may address the above-described shortcomings by including the processor 110 configured to recognize a starting point and an object code at both ends of a relationship line first, and then check whether a relationship line between the recognized starting point and the recognized object code is present.

As described above, the method of the processor 110 recognizing a relationship line first may have misrecognition and malfunction. On the other hand, the method of the processor 110 recognizing a starting point and an object code first may have a higher recognition rate because a starting point and an object code are less likely to be misrecognized than a relationship line.

As a result, the processor 110 recognizes a starting point and an object code, which have relatively low recognition difficulty, first and then checks whether a relationship line exists between the starting point and the object code by machine learning through a classification algorithm to be described below, thereby the handwritten relationship line at a high recognition rate.

That is, the processor 110 may be configured to learn and recognize various types of relationship lines through machine learning without conditions that unless relationship lines should have to having straight line and curved components as in the related art.

The communicator 120 may be configured to communicate with the scanner 200 and the external database 300 through wired or wireless communication, and may comprise a wireless communicator 121 and a wired communicator 122.

As an example of the communication method, the communicator 120 may be configured to employ the second generation (2G) communication method, such as Time Division Multiple Access (TDMA) and Code Division Multiple Access (CDMA), the third generation (3G) communication method, such as a wideband code Wide Code Division Multiple Access (WCDMA), Code Division Multiple Access 2000 (CDMA2000), Wireless Broadband (Wibro), and World Interoperability for Microwave Access (WiMAX), and the fourth generation (4G) communication method, such as Long Term Evolution (LTE) and WiBro Evolution. The communicator 120 may be configured to employ the fifth generation (5G) communication method.

The communicator 120 may comprise one or more components that enable communication with an external device, and may comprise, for example, at least one of a short-range communication module, a wired communicator 122, and a wireless communicator 121.

The short-range communication module may comprise various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communicator 122 may comprise various wired communicators 122, such as a controller area network (CAN) communication module, a local area network (LAN) module, a wide area network (WAN) module, or a value added network communication (VAN) module, and may in addition comprise various cable communication modules, such as a universal serial bus (USB) module, a high definition multimedia interface (HDMI) module, a digital visual interface (DVI) module, a recommended standard-232 (RS-232) module, a power line communication module, or a plain old telephone service (POTS)module.

The wireless communicator 121 may comprise Radio Data System-Traffic Message Channel (RDS-TMC), Digital Multimedia Broadcasting (DMB), Wi-Fi module, Wi-Bro module, and may also comprise a wireless communicator 121 that supports a global System for Mobile Communication (GSM), CDMA, WCDMA, universal mobile telecommunications system (UMTS), TDMA, LTE, etc.

The wireless communicator 121 may comprise a wireless communication interface comprising an antenna and a receiver for receiving a signal. In addition, the wireless communicator 121 may further comprise a signal conversion module for demodulating an analog wireless signal received through the wireless communication interface into a digital control signal.

The communicator 120 may be configured to receive data about a scanned paint test sheet from the scanner 200.

The communicator 120 may be configured to communicate with the external database 300 to store information about content of a defect code in the paint test sheet, a defect location in the paint test and whether a correction is made, which are determined by the processor 110.

The memory 130 may comprise a volatile memory, such as a Static Random Access Memory (S-RAM), D-RAM, etc., and a non-volatile memory, such as a read only memory (ROM) and an erasable programmable read only memory (EPROM). The memory 130 may comprise a single memory element 130 or a plurality of memory elements 130.

The scanner 200 may refer to a device that converts texts, drawings, photos, etc. displayed on a paper sheet into a digital file that is to be processed by the processor 110. The scanner 200 used in the method of estimating the relationship between objects according to the embodiment is not limited thereto as long as it can convert drawings, lines, etc. displayed on a paper sheet into a digital files.

The scanner 200 may comprise types of a flatbed scanner, a document scanner, a drum scanner, and the like, but the present disclosure is not limited, and the scanner 200 may be a concept including an image device.

The image device may comprise any device capable of converting an image into a digital file, including a camera. For example, the image device may be a mobile phone camera, and the mobile phone camera may be configured to photograph a paint test sheet and transmit a scanned image of the paint test sheet through communication with the communicator 120.

A method of the processor 110 estimating the result of the paint test sheet through the scan image is the same as the case of receiving the scan image through the scanner 200.

The processor 110 may be configured to control the communicator 120 to communicate with the external database 300, and may be configured to control the communicator 120 to store details, such as content of a defect, a location of a defect and whether a correction is made, in the external database 300.

The database 300 may refer to a set of data stored under a certain standard, and the data may be stored in the database 300 in units of tables.

The database 300 may be configured to store related information in one table and maintain a plurality of tables to store data systematically. That is, the database 300 may be configured to store a table in which a defect code corresponding to content of a defect in the result of the paint test sheet is set as one attribute, and a defect location is set as another attribute.

As described above, the result of the paint test sheet may be stored in the database 300 and information desired by the inspector may be utilized so that the entire defects on the paintwork may be investigated in a short period of time, and thus the efficiency may be increased.

FIG. 2 is a diagram illustrating a vehicle development view and defect codes in the method of estimating a relationship between objects according to the embodiment.

Referring to FIG. 2, in one of development views of the vehicle 410 printed on a paint test sheet, which is viewed from the top, respective sites are connected to corresponding defect codes by relationship lines.

Before the processor 110 recognizes a starting point and an object code, the memory 130 may be configured to store information about a defect site of the point in which a starting point is located.

The defect sites distinguishable in the development view of the vehicle may be divided into a hood, a fender, a front door, a rear door, a roof, a trunk, etc., but this is merely an example.

As shown in FIG. 2, it can be seen that object codes and relationship lines are manually input by the operator, and thus the object codes have different shapes and the relationship lines also have different shapes.

The object code comprises a defect code, and the defect code may express various types of defects as shown in FIG. 4. In addition, the defect code may express the type of a defect in alphabets, but is not limited thereto, and may be expressed in numbers or Hangul.

Since the defect code is manually entered by the operator who inspects the paintwork, both the size and shape of the defect code may vary. Since the varying size and shape of the defect code may lower the defect code recognition rate of the processor 110, machine learning may be used to increase the recognition rate.

A method of the processor 110 recognizing an object by machine learning may employ a Convolution Neural Network (CNN) algorithm, and details thereof will be described below with reference to FIG. 5.

The processor 110 may be configured to recognize a defect code and a starting point through machine learning, and may be configured to determine a defect site according to the point in which the starting point is located in the development view.

For example, when the starting point is recognized at a center point of the vehicle 410, it may be determined that the paintwork in the roof has a defect. In addition, when the starting point is recognized at the rightmost side of the vehicle 410, it may be determined that the paintwork in the trunk of the vehicle 410 has a defect.

The processor 110 may be configured to determine the defect site according to the recognized starting point, and transmit the determined defect location to the database 300 so that the defect location is stored.

The inspector may be configured to intuitively identify the defect site through the name of the defect site stored in the database 300, and when the defect rate of a specific site of the vehicle 410 is higher than a certain rate, may be configured to take an action, such as a supplementary process.

FIG. 3 is a diagram illustrating a form of a paint test sheet result being stored in a database 300 in the method of estimating a relationship between objects according to the embodiment, and FIG. 4 is a diagram illustrating an example of defect codes of the method of estimating a relationship between objects according to the embodiment.

The database 300 comprises a row representing one entity and a column representing attributes of the entity, and is managed through a Database Management System (DBMS).

The DBMS may refer to a management system capable of generating a new table in the database 300 or generating a new table in the table and inquiring the new table.

Accordingly, the processor 110 may be configured to transmit a predetermined command to the DBMS to store content of a defect of the paint test sheet.

The processor 110 may be configured to use structured query language (SQL) to provide a command to the DBMS. The processor 110 may be configured to provide the DBMS with a command to store the defect content of the paint test sheet using SQL, and control the DBMS to store the defect content.

The processor 110 may be configured to recognize a vehicle model and a body number (BODY NO) printed or recorded on one side of the paint test sheet and control the DBMS to store the vehicle model and the body number in the database 300.

Referring to FIG. 4 in conjunction with FIG. 3, the processor 110 may be configured to convert content of a defect code recognized through machine learning into a Hangul corresponding to the content of the defect code, and store the converted content of the defect code in the database 300.

As an example, when the processor 110 recognizes a defect code as 'D', which corresponds to defect content 'dust' as shown in FIG. 4, the processor 110 may be configured to control the DBMS to store the defect content as 'dust'.

As another example, when the processor 110 recognizes a defect code as 'CV', which corresponds to defect content 'concave and convex' as shown in FIG. 4, the processor 110 may be configured to control the DBMS store the defect content as 'concave and convex'.

The processor 110 may be configured to convert a defect location corresponding to a location of a starting point into Korean and store the converted defect location in the database 300.

As an example, when the processor 110 recognizes the location of the starting point as a location corresponding to the bonnet of the vehicle 410, in which case the defect location is 'hood', the processor 110 may be configured to control the DBMS to store the defect location as 'hood'.

As another example, when the processor 110 recognizes the location of the starting point as a paintwork surrounding the rear wheel, in which case the defect location is 'fender (RR)', the processor 110 may be configured to control the DBMS to store the defect location as 'fender (RR)'.

FIG. 5 is a diagram illustrating a convolution neural network (CNN), which is a machine learning network applied to the method of estimating a relationship between objects according to the embodiment.

A CNN algorithm is a type of deep learning algorithm, and when a specific image is input as an input value, the input value is converted into an output value indicating an object that represent the image.

The CNN algorithm may be used to, even when input values representing the same output value have different forms, derive a characteristic representing the image so that the same output value is derived.

In the method of estimating the relationship between objects according to the embodiment, since the operator manually inputs the starting point and the object code, the object code and the starting point may vary, and when the operator is changed, the varying degree of the form may be further increased.

Accordingly, the processor 110 may be configured to use the CNN algorithm to exhibit a high reliability even with a deformation of the starting point and object code that are input in a hand-writing.

Referring to FIG. 5, an example of a CNN used as a component of a network for recognizing an object code according to the embodiment is illustrated.

A CNN used in the method of estimating a relationship between objects according to the embodiment may comprise at least one convolutional layer 421, at least one pooling layer 421-1, fully connected layers 422 and 422-1, and an output value 423.

The convolutional layer 421 may have a depth that is determined according to the designer of the algorithm. The convolutional layer 421 may have a defect code, which is an object code manually input by an operator, as an input value of the layer, and apply a weight to the input value to calculate feature maps.

The input value may comprise data for primary basic learning, which may be English Extended Modified National Institute of Standards and Technology database (EMNIST) and numeric Modified National Institute of Standards and Technology database (MNIST), and data for secondary supervised learning, which may be a personal handwriting for each operator.

The pooling layer 421-1 may also have a depth that is determined according to a designer, similar to the convolutional layer 421.

The pooling layer 421-1 may be configured to reduce the size of the feature map of the at least one convolutional layer 421 through subsampling. As such, when the pooling layer 421-1 reduces the size of the feature map, parameters to be learned by the network is reduced so that the output is simplified.

In FIG. 5, for the sake of convenience of description, only one convolutional layer 421 and one pooling layer 421-1 are illustrated, but it should be understood that a plurality of layers may be designed.

The fully connected layers 422 and 422-1 may be connected to all activations of the pooling layer 421-1.

The CNN may be configured to use the output value of the fully connected layer, to estimate the defect content of the input object code.

Similar to the description above, the processor 110 may be configured to recognize a starting point of a relationship line.

The convolutional layer 421 may have the starting point of the relationship line manually input by the operator as an input value of the layer and apply a weight to the input value to calculate feature maps.

The pooling layer 421-1 may have a depth that is determined according to a designer, similar to the convolution layer 421.

The pooling layer 421-1 may be configured to reduce the size of the feature map of the at least one convolutional layer 421 through subsampling. As such, when the pooling layer 421-1 reduces the size of the feature map, parameters to be learned by the network is reduced so that the output is simplified.

The fully connected layers 422 and 422-1 may be connected to all activations of the pooling layer 421-1, and the CNN may be configured to use the output value of the fully connected layer to recognize the input starting point and estimate the defect site.

Since the method of estimating the relationship between objects according to the embodiment recognizes the starting point of the relationship line and the object code using deep learning as described above, even when the object code and the starting point are deformed according to the operator, an output value with a high reliability may be secured.

Accordingly, handwritten relationship lines may be easily derived and the recognition rate of relationship lines may be increased compared to the related art.

Figure 6:
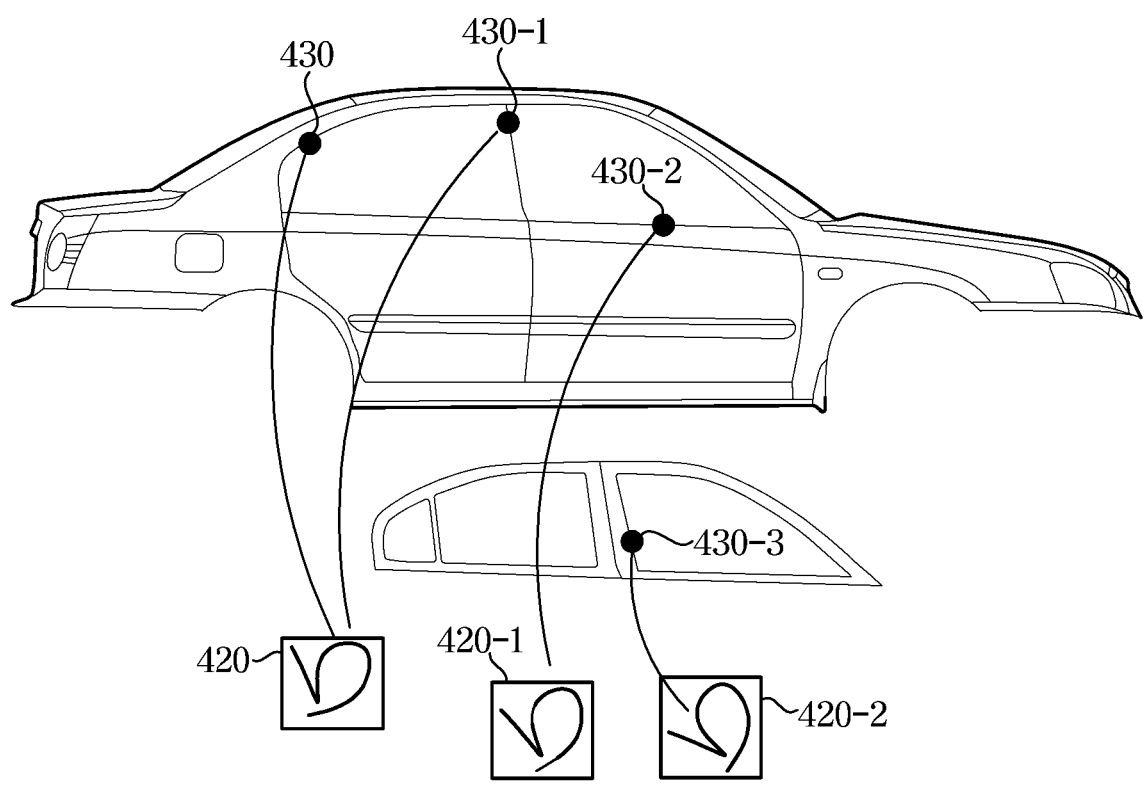
FIG. 6 is a diagram illustrating labeling of a starting point, a defect code, and a relationship line in the method of estimating a relationship between objects according to the embodiment.

FIG. 6 is a diagram illustrating labeling of a starting point, a defect code, and a relationship line in the method of estimating a relationship between objects according to the embodiment.

The processor 110 may be configured to label a starting point, an object code, and a relationship line to learn whether a relationship line is present.

In FIG. 6, the processor 110 may be configured to label an object code 420 located on the leftmost side as '1', label an object code 420-1 located on the middle as '2', and label an object code 420-2 located on the rightmost side as '3'.

In addition, the processor 110 may be configured to label a starting point 430 located on the leftmost side 'a', label a starting point 430-1 on the right side of the starting point 430 as 'b', label a starting point 430-2 located on the next right side of the starting point 430 as 'c', and label a starting point 430-3 located on the lowermost side as 'd'.

When the labeling is completed, whether a relationship line between each starting point and each object code is present may be labeled.

For example, the object code '1' 420 has relationship lines with the starting point 'a' 430 and the starting point 'b' 430-1, providing labels (1-a, L1) and (1-b, L1).

In addition, the object code '2' 420-1 has a relationship line with the starting point 'c' 430-2, providing a label (2-c, L1), and the object code '3' 420-2 has a relationship line with the starting point 'd' 430-3, providing a label (3-d, L1).

Such labeled data may form correct answer data used for the processor 110 to learn whether a relationship line is present.

The processor 110 may be configured to use the labeling data, which is correct answer data, as an input value to learn whether a relationship line between the object code and the starting point is present through machine learning.

Accordingly, the processor 110 may be configured to secure a significantly higher recognition rate and reliability than in the case of simply recognizing a relationship line through image processing as in the related art.

Figure 7A:
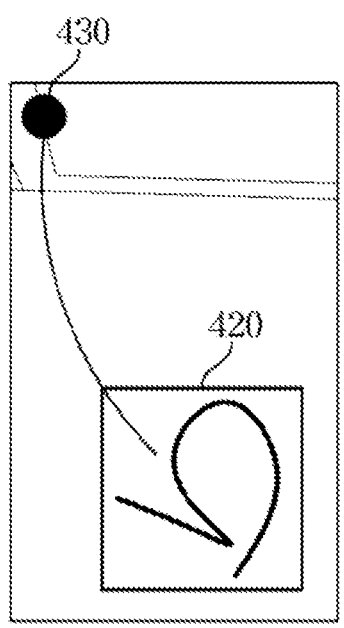
FIGS. 7A and 7B are diagrams for describing a case of a defect code and a starting point that are related and a case of a defect code and a starting point that are not related in the method of estimating the relationship between objects according to the embodiment.
Figure 7B:
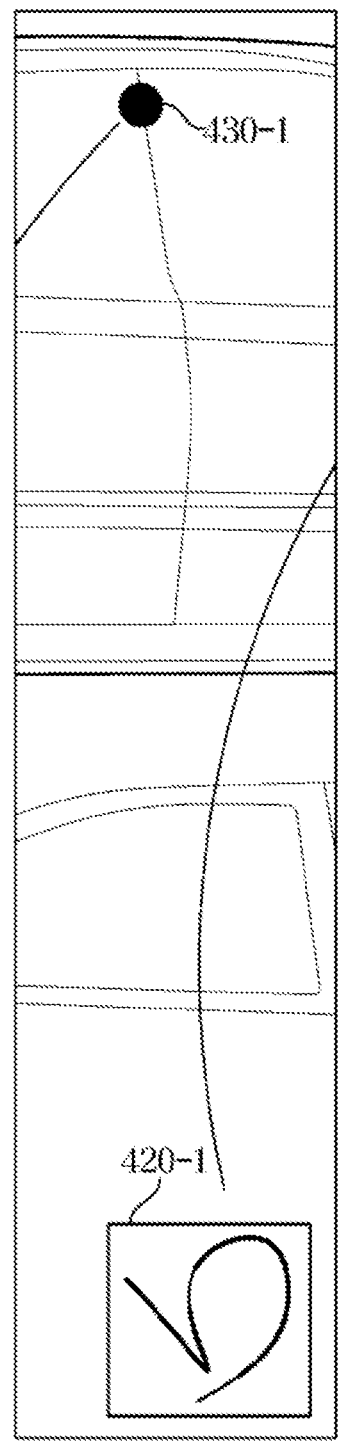
Figure 8A:
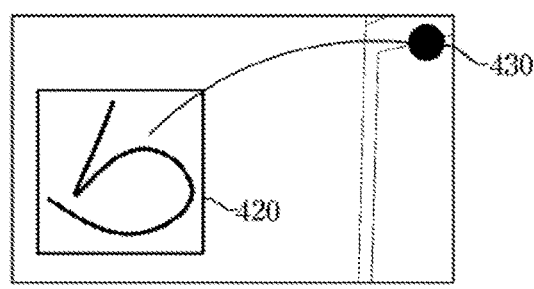
FIGS. 8A and 8B are diagrams illustrating a process of transforming an image so that a starting point is positioned in a predetermined direction in the method of estimating a relationship between objects according to the embodiment.
Figure 8B:
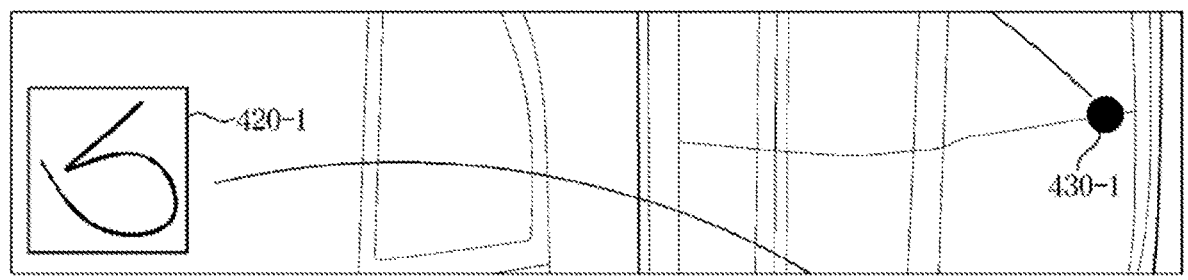

FIGS. 7A and 7B are diagrams for describing a case of a defect code and a starting point that are related and a case of a defect code and a starting point that are not related in the method of estimating the relationship between objects according to the embodiment, and FIGS. 8A and 8B are diagrams illustrating a process of transforming an image so that a starting point is positioned in a predetermined direction in the method of estimating a relationship between objects according to the embodiment.

Referring to FIG. 7, the processor 110 may be configured to crop a minimum area image in which a starting point and an object code exist, to minimize an influence of a factor that is not the presence or absence of a relationship between an object code and a starting point.

In FIG. 7, the processor 110 crops the image as a rectangle, but the shape of the cropped image is not limited thereto as long as it can display both the starting point and the object code with a minimum size.

A factor that may lower the reliability of the processor 110 in determining the presence or absence of a relationship line may be when surrounding contaminations or other marks are mixed with objects.

That is, an object code and a starting point may be connected in various forms, but the most efficient form of an object code and the starting point being connected by an operator may be a form similar to a straight line.

Accordingly, straight lines or curved lines in the remaining area except for the minimal rectangular image including both the object code and the starting point may be irrelevant to the relationship line. For example, the remaining area may be highly likely to be an area that may lower the reliability, such as an area showing the exterior of the vehicle 410 on the development view or displaying a line drawn by a mistake by an operator.

The processor 110 may be configured to crop the image to exclude an area irrelevant to the relationship line as described above, and use the cropped image to learn the presence or absence of a relationship line.

FIG. 7A illustrates a case in which the object code 420 is related to the starting point 430 is shown, and the processor 110 may be configured to, based on the object code 420 and the starting point 430 being connected with a curve close to a straight line, learn that the object code 420 is related to the starting point 430.

FIG. 7B illustrates a case in which the object code 420-1 is not related to the starting point 430-1, and the processor 110 may be configured to, based on no line extending between the object code 420-1 and the starting point 430-1, learn that the object code 420-1 is not related to the starting point 430-1.

As described above, the processor 110 may be configured to first recognize a starting point and an object code that have a relatively low recognition difficulty, and check whether a relationship line is present between the starting point and the object code by machine learning.

The processor 110, in a state of having recognized the starting point of the relationship line and the object code, may only need to check whether a component connecting the starting point and the object code is present, so that the recognition rate of the handwritten relationship line may be significantly increased.

Referring to FIGS. 8A and 8B, it can be seen that the processor 110 rotates the image such that the starting point is positioned to the upper right side to improve the recognition rate and reliability of the handwritten relationship line.

Here, the processor 110 does not need to rotate the image in the direction of the upper right side, and may be rotated in various directions as long as all cropped images are converted to be positioned in a uniform direction because even when different images are input, uniform learning and classification are performable only if the starting point and the object code are positioned in a predetermined direction.

Specifically, FIG. 8A is a diagram illustrating an object code 420 and a starting point 430 that are related to each other, in which the starting point 430 is positioned to the upper right side. The processor 110 may be configured to, upon determining that a straight line or curved line component connecting the object code 420 and the starting point 430 in a direction from a lower left side to an upper right side is present, learn that the object code 420 and the starting point 430 are related to each other.

Next, FIG. 8B is a diagram illustrating an object code 420-1 and a starting point 430-1 that are not related to each other, in which the starting point 430-1 is positioned to the upper right side. The processor 110 may be configured to, upon determining that a straight line or curved line component connecting the object code 420-1 and the starting point 430-1 in a direction from a lower left side to an upper right side is absent, learn that the object code 420-1 and the starting point 430-1 are not related to each other.

In addition, the process of the processor 110 converting the cropped image in a predetermined direction may be used not only for learning the presence or absence of a relationship, but may also for estimating the presence or absence of a relationship through a trained model.

As described above, when the processor 110 match the directions of the starting points and the object codes in images in a predetermined direction, there is no need to consider the direction in determining the similarity between the images, so that the efficiency of learning and estimating the relationship between objects may be increased.

Figure 9A:
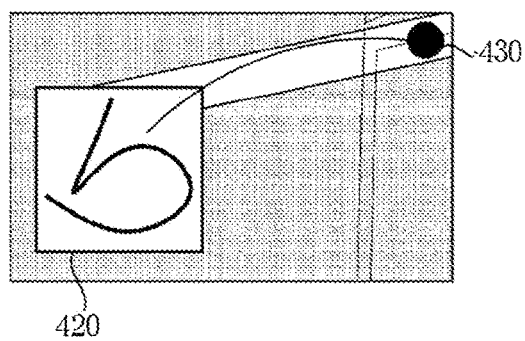
FIGS. 9A and 9B are diagrams illustrating masking of an image portion that is not needed for result estimation in the method of estimating a relationship between objects according to the embodiment.
Figure 9B:
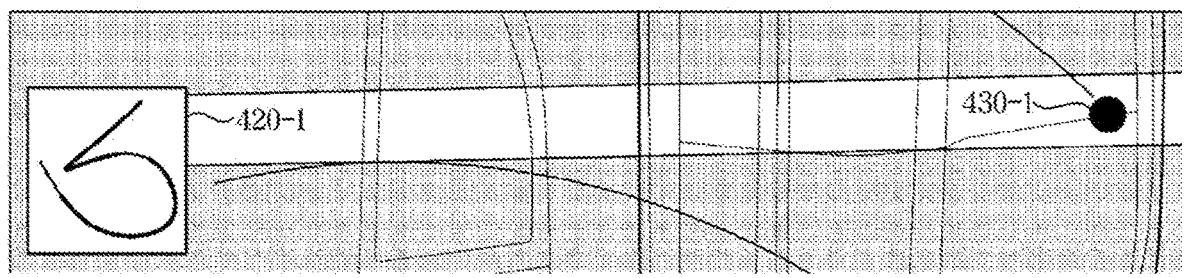

FIGS. 9A and 9B are diagrams illustrating masking of an image portion that is not needed for result estimation in the method of estimating a relationship between objects according to the embodiment.

Referring to FIGS. 9A and 9B, the processor 110 may be configured to mask an area except for a part including the starting point and the object code.

FIG. 9A illustrates a case in which a relationship line is present between an object code 420 and a starting point 430. An area except for the relationship line may be masked.

FIG. 9B illustrates a case in which a relationship line is absent between an object code 420-1 and a starting point 430-1. An area except for a certain space between the object code 420-1 and the starting point 430-1 may be masked.

The processor 110 may be configured to mask a part except for a space between a starting point and an object code, and the area to be masked may vary according to an algorithm designer.

When the processor 110 masks the part except for the space between the starting point and the object code, an influence of a factor that is not the presence or absence of a relationship line may be reduced along with the image cropping.

Accordingly, the processor 110 does not consider the masked part in a process of inferring whether the starting point and the object code are related to each other, thereby securing a high reliability when employing a classification algorithm through machine learning.

The processor 110 may be configured to, in order to determine whether a relationship line is present, employ a classification algorithm through machine learning, and may be configured to employ a CNN algorithm described above.

Figure 10:
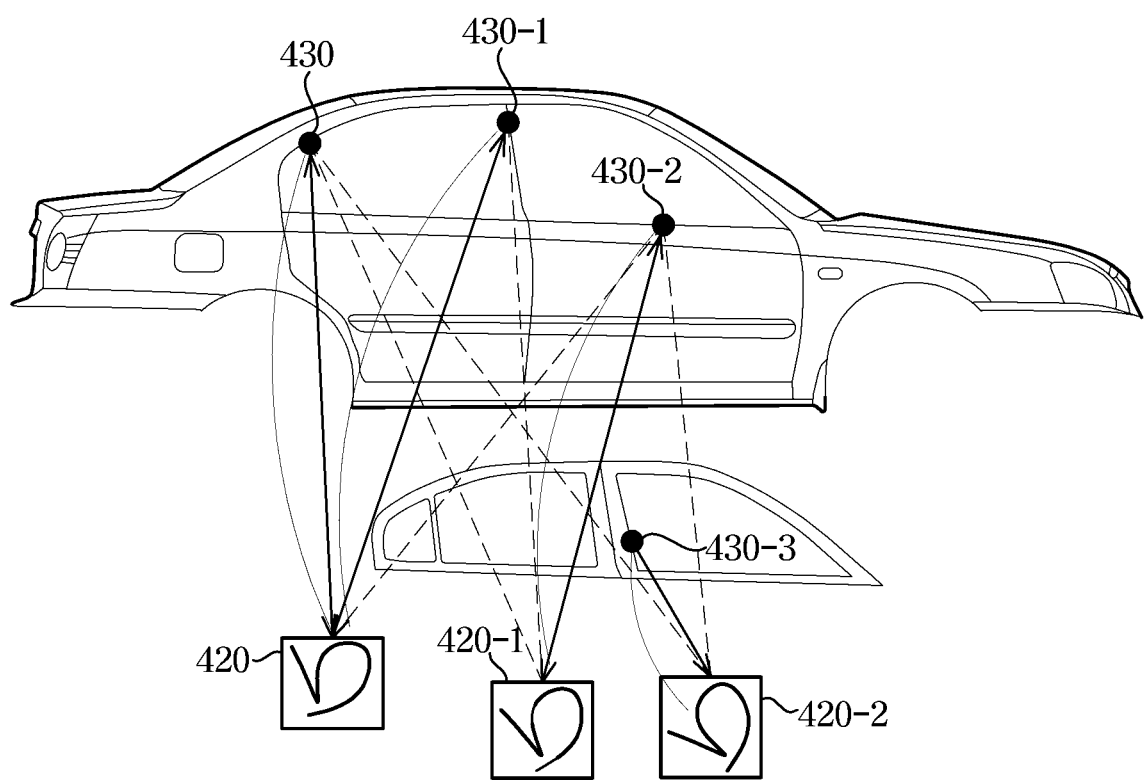
FIG. 10 is a diagram illustrating considering of all combinations between starting points and defect codes in the method of estimating a relationship between objects according to the embodiment.

FIG. 10 is a diagram illustrating considering of all combinations between starting points and defect codes in the method of estimating a relationship between objects according to the embodiment.

The processor 110 may be configured to learn about detection of starting points and object codes and presence or absence of relationship lines, and estimate the presence or absence of relationship lines through a trained model.

A method of the processor 110 estimating the presence or absence of a relationship line may be a method of recognizing a starting point of a relationship line and an object code first, and then checking whether a relationship line between the recognized starting point and the recognized object code is present.

The method of the processor 110 recognizing a starting point and an object code first may have a higher recognition rate because a starting point and an object code are less likely to be misrecognized than a relationship line is misrecognized.

Accordingly, the processor 110 may be configured to label all combinations between the recognized starting points and the recognized object codes.

The processor 110 may be configured to label all combinations in which a relationship line may present, and crop images for all the combinations.

The processor 110 may be configured to crop a minimum area image in which a starting point and an object code exist, to minimize an influence of a factor that is not the presence or absence of a relationship between an object code and a starting point.

In this case, the cropping of the images for all combinations by the processor 110 may be a process for using the cropped image as an input value of a trained model and obtaining an output value indicating a presence or absence of a relationship line with a high reliability.

The processor 110 may be configured to rotate the image such that the starting point is positioned to the upper right side to improve the recognition rate and reliability of handwritten relationship lines, similar as in the learning operation.

Here, the processor 110 does not need to rotate the image in the direction of the upper right side, and may be rotated in various directions as long as all cropped images are converted to be positioned in a uniform direction because even when different images are input, uniform learning and classification are performable only if the starting point and the object code are positioned in a predetermined direction.

As the processor 110 matches the directions of the starting points and the object codes in images in a predetermined direction, there is no need to consider the direction in determining the similarity between the images, so that the efficiency of detection may be increased.

The processor 110 may be configured to, after cropping the image, mask an area except for a part including the starting point and the object code.

The processor 110 may be configured to mask a part except for a space between a starting point and an object code, and the area to be masked may vary according to an algorithm designer.

When the processor 110 masks the part except for the space between the starting point and the object code, an influence of a factor that is not the presence or absence of a relationship line may be reduced along with the image cropping.

Accordingly, the processor 110 does not consider the masked part in a process of inferring whether the starting point and the object code are related to each other, thereby securing a high reliability when employing a classification algorithm through machine learning.

Thereafter, the processor 110 may be configured to estimate the presence or absence of a relationship line on all combinations of the masking images through a classification algorithm to, and with respect to a combination determined to have a relationship, control the communicator 120 to transmit the defect content, the defect location, and whether correction is made to the external database 300.

Figure 11:
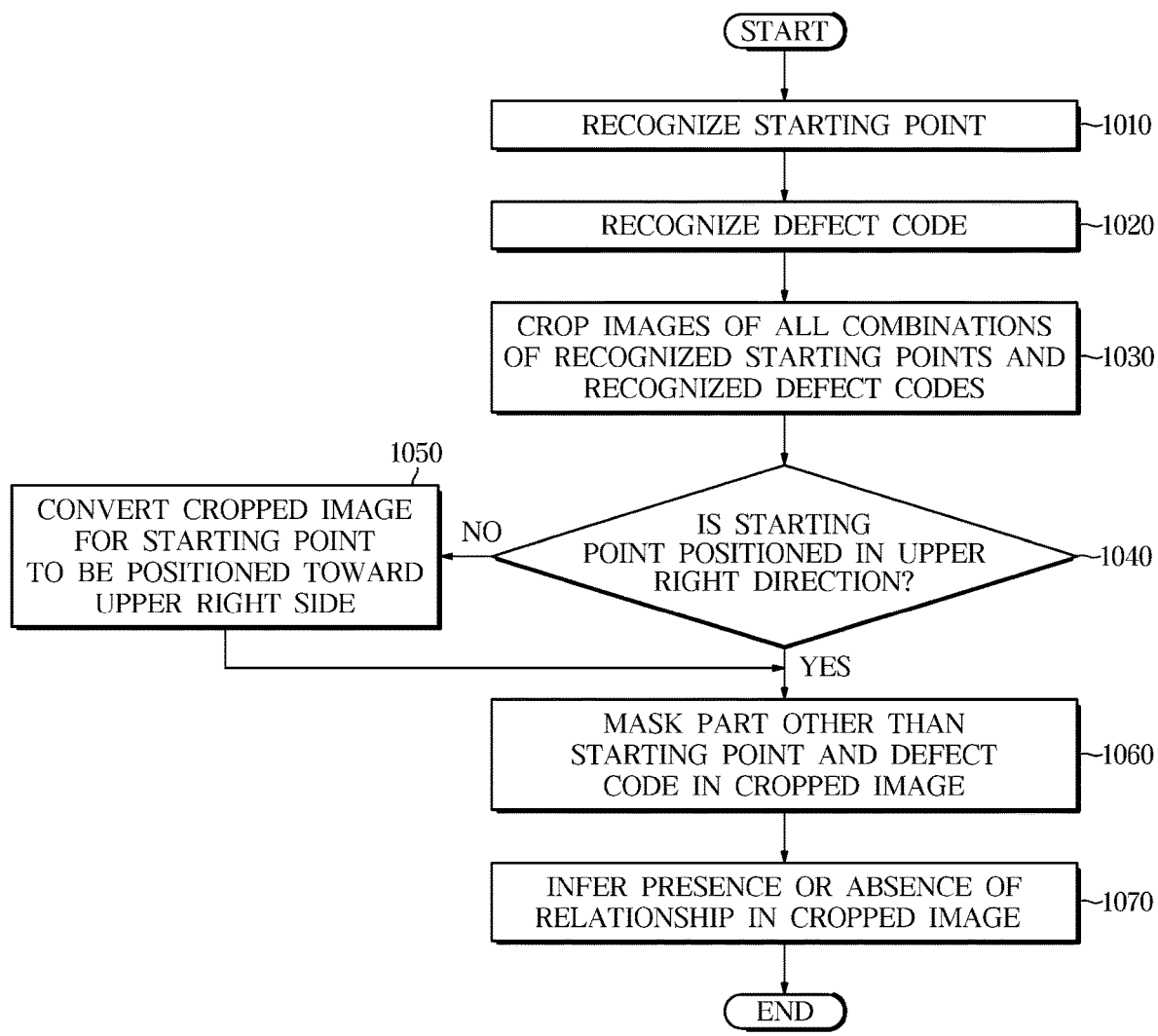
FIG. 11 is a control flowchart showing an example of estimating a relationship between objects in the method of estimating a relationship between objects according to the embodiment.

FIG. 11 is a control flowchart showing an example of estimating a relationship between objects in the method of estimating a relationship between objects according to the embodiment.

First, the processor 110 may be configured to recognize a starting point through a model trained by machine learning, to determine whether a relationship line between a starting point and an object code is present (1010). Although the above description has been made in relation that a recognition and detection model is pre-trained through machine learning, recognition may be performed at the same time as training a model.

The processor 110 may be configured to recognize a defect code, which is an object code, through the model trained by machine learning, to determine whether a relationship line is present (1020).

Since the processor 110 has a learning model that may determine the presence or absence of a relationship line on a cropped image, the processor 110 may be configured to label all combinations in which a relationship line between the recognized starting point and the defect code may be present, and crop images (1030).

The processor 110 may be configured to determine whether the starting point is positioned on the upper right side in the cropped image (1040), and upon determining that the starting point is not positioned on the upper right direction (No in operation 1040), convert the cropped image such that the starting point is positioned on the upper right direction (1050).

However, as described above, the processor 110 does not need to rotate the image in the direction of the upper right side, and may be rotated in various directions as long as all cropped images are converted to be positioned in a uniform direction because even when different images are input, uniform learning and classification are performable only if the starting point and the object code are positioned in a predetermined direction.

As the processor 110 matches the directions of the starting points and the object codes in images in a predetermined direction, there is no need to consider the direction in determining the similarity between the images, so that the efficiency of learning may be increased.

Thereafter, the processor 110 may be configured to mask a part except for the starting point and the defect code in the cropped image (1060).

The processor 110 may be configured to appropriately mask a part other than the starting point and the defect code to provide only the most optimal space in which the relationship line may be likely to be present as a classification target, so that the classification efficiency may be enhanced.

The processor 110 may be configured to determine the presence or absence of a relationship line on all combinations of the masking images and infer whether a relationship is present through a model trained by machine learning (1070).

Thereafter, the processor 110 may be configured to, for a combination determined to have a relationship, control the communicator 120 to transmit the defect content, the defect location, and whether correction is made to the external database 300.

As is apparent from the above, the method of estimating a relationship between objects according to an aspect and the electronic device for the same can store a defect occurrence site of a paintwork of a vehicle and the defect type in a database through machine learning, thereby obtaining data for quality improvement of the vehicle paintwork more quickly and accurately.

Although embodiments of the present disclosure have been described for illustrative purposes, those skilled in the art will appreciate that various modifications, additions and substitutions are possible, without departing from the scope and spirit of the present disclosure. Therefore, embodiments of the present disclosure have not been described for limiting purposes.

What is claimed is:

1. A method of estimating a relationship between objects through machine learning, the method comprising:
   receiving, by a processor of an electronic device, a scan image;
   recognizing, by the processor, a plurality of starting points and a plurality of object codes in the scan image using a trained Convolution Neural Network (CNN);
   determining, by the processor, whether a relationship line is present between a recognized plurality of starting points and a recognized plurality of object codes, which comprises:
      cropping an area comprising a plurality of combinations between the plurality of starting points and the plurality of object codes in the scan image;
      converting the scan image such that a starting point is positioned in an upper right side in a cropped image;
      recognizing a thickness of the relationship line; and
      determining the relationship between the objects as having a higher importance as the thickness of the relationship line is greater;
   based on determining that the relationship line is present, transmitting, by the processor, a combination of the starting point and an object code connected with the relationship line to a database;
   setting, by the processor, defect sites based on an area boundary line of a development view of a vehicle;
   determining, by the processor, a position of the starting point as a defect site and transmitting the defect site to the database; and
   storing, by the processor, the defect site in the database.

2. The method of claim 1, wherein:
   each of the plurality of combinations comprises:
   one of the plurality of starting points and at least one of the plurality of object codes; or at least one of the plurality of starting points and one of the plurality of object codes.

3. The method of claim 1, wherein determining whether the relationship line is present between the recognized plurality of starting points and the recognized plurality of object codes comprises:
   masking a part other than the starting point and the object code in the cropped image.

4. The method of claim 1, wherein the recognizing of the object code in the scan image comprises:
   representing a degree of similarity between a recognized text and an object code as a probability; and
   based on the degree of similarity being greater than or equal to a preset probability, determining the recognized text as the object code.

5. The method of claim 1, further comprising:
   obtaining a machine learning model for determining whether the relationship line between a starting point and the object code is present by learning a relationship between a plurality of existing starting points and a plurality of existing object codes using the Convolution Neural Network (CNN),
   wherein the machine learning model is configured to:
   employ a detection algorithm to recognize the starting point and the object code; and
   employ a classification algorithm to determine whether the relationship line is present.

6. The method of claim 5, wherein the obtaining of the machine learning model comprises:
   labeling presence or absence of the relationship;
   cropping an image of a part in which the starting point is related to the object code and an image of a part in which the starting point is unrelated to the object code, generating a cropped image;
   storing the cropped image in a memory;
   converting the cropped image such that the starting point is positioned in a predetermined direction; and
   masking a part other than the starting point and the object code in the cropped image.

7. The method of claim 1, wherein the determining whether a relationship line is present between the starting point and the recognized object code comprises:
   recognizing a shape of the relationship line; and
   classifying an attribute of the relationship between the objects according to the shape of the relationship line.

8. An electronic device for estimating a relationship between objects through machine learning, the electronic device comprising:
   a communicator configured to receive a scan image;
   a memory configured to store the scan image received by the communicator; and
   a processor configured to:
      recognize a plurality of starting points and a plurality of object codes in the scan image using a trained Convolution Neural Network (CNN);
      determine whether a relationship line is present between a recognized plurality of starting points and a recognized plurality of object codes to estimate a presence or absence of a relationship;
      crop an area comprising a plurality of combinations between the plurality of starting points and the plurality of object codes in the scan image;
      convert the scan image such that a starting point is positioned in an upper right side in a cropped image;
      recognize a thickness of the relationship line;
      determine the relationship between the objects as having a higher importance as the thickness of the relationship line is greater;
      based on determining that the relationship line is present, transmit a combination of the starting point and an object code connected with the relationship line to a database;
      set defect sites based on an area boundary line of a development view of a vehicle;
      determine a position of the starting point as a defect site and transmit the defect site to the database; and
      store the defect site in the database.

9. The electronic device of claim 8,
wherein each of the plurality of combinations comprises:
one of the plurality of starting points and at least one of the plurality of object codes; or
at least one of the plurality of starting points and one of the plurality of object codes.

10. The electronic device of claim 8, wherein the processor is further configured to mask a part other than the starting point and the object code in a converted image.

11. The electronic device of claim 8, wherein the processor is further configured to:
represent a degree of similarity between a recognized text and an object code as a probability; and
based on the degree of similarity being greater than or equal to a preset probability, determine the recognized text as the object code.

12. The electronic device of claim 8, wherein the processor is further configured to:
obtain a machine learning model for determining whether the relationship line between the starting point and the object code is present by learning a relationship between a plurality of existing starting points and a plurality of existing object codes using the Convolution Neural Network (CNN),
wherein the machine learning model is configured to:
employ a detection algorithm to recognize the starting point and the object code; and
employ a classification algorithm to determine whether the relationship line is present.

13. The electronic device of claim 12, wherein the processor is further configured to:
label presence or absence of the relationship;
crop an image of a part in which the starting point is related to the object code and an image of a part in which the starting point is unrelated to the object code, generating a cropped image;
store the cropped image in the memory;
convert the cropped image such that the starting point is positioned in a certain direction; and
mask a part other than the starting point and the object code in the cropped image.

14. The electronic device of claim 8, wherein the processor is further configured to:
recognize a shape of the relationship line; and
classify an attribute of the relationship between the objects according to the shape of the relationship line.

* * * * *